United States Patent
Ziebertz (10) Patent No.: US 7,746,216 B2
(45) Date of Patent: Jun. 29, 2010

(54) METHOD AND CIRCUIT ARRANGEMENT FOR HOLDING A CONTROL STATE DURING INADEQUATE POWER SUPPLY IN AN RF TRANSPONDER OR REMOTE SENSOR

(75) Inventor: Dirk Ziebertz, Eberstadt (DE)

(73) Assignee: Atmel Automotive GmbH, Heilbronn (DE)

( * ) Notice: Subject to any disclaimer, the term of this patent is extended or adjusted under 35 U.S.C. 154(b) by 1058 days.

(21) Appl. No.: 11/058,056

(22) Filed: Feb. 14, 2005

(65) Prior Publication Data

US 2005/0179520 A1 Aug. 18, 2005

(30) Foreign Application Priority Data

Feb. 13, 2004 (DE) .................. 10 2004 007 106

(51) Int. Cl.
*H04Q 5/22* (2006.01)
(52) U.S. Cl. ..................... 340/10.34; 342/51
(58) Field of Classification Search ............. 340/10.34, 340/7.32, 825.54, 10.1, 572.7, 10.3, 572.1, 340/10.2; 455/83
See application file for complete search history.

(56) References Cited

U.S. PATENT DOCUMENTS

| | | | |
|---|---|---|---|
| 5,926,107 A | 7/1999 | Glehr | |
| 5,963,144 A | 10/1999 | Kruest | |
| 6,404,325 B1 * | 6/2002 | Heinrich et al. | .......... 340/10.34 |
| 2003/0137400 A1* | 7/2003 | Heinrich et al. | ............ 340/7.32 |
| 2005/0134318 A1* | 6/2005 | Baude et al. | ................. 326/104 |

FOREIGN PATENT DOCUMENTS

| | | |
|---|---|---|
| DE | 196 05 836 | 1/1997 |
| EP | 0 601 739 | 6/1994 |
| WO | WO 01/65712 | 9/2001 |
| WO | WO 03/063076 | 7/2003 |

OTHER PUBLICATIONS

Finkenzeller, RFID Handbuch, (RFID Handbook) "6 Codierung und Modulation", BNSDOCID:<XP 2249954A 1 >; 1998; pp. 38-42 and 105-117.
English Translation of Finkenzeller, RFID Handbook, BNSDOCID:<XP 2249954A 1>; 1998; pp. 105-117.

* cited by examiner

*Primary Examiner*—Brian A Zimmerman
*Assistant Examiner*—Nabil H Syed
(74) *Attorney, Agent, or Firm*—Muncy, Geissler, Olds & Lowe, PLLC (57) ABSTRACT

An RF transponder includes an input circuit, a read/memory circuit, and a circuit arrangement for holding a control state. The circuit arrangement includes a first storage device (e.g. a D-flip-flop) for storing the control state dependent on received control signals, and a second storage device (e.g. a capacitor and a transistor) for holding the control state during a period of inadequate energy supply to the circuit arrangement, e.g. while the transponder is in a field gap of the electromagnetic field emitted by a base station with which the transponder communicates. In an operating method, the control state is held by the second storage device during a period of inadequate energy supply. Then, when adequate energy is again supplied, the transponder resumes the control state that was held by the second storage device. The transponder continues to operate properly according to an anti-collision procedure in a system of several transponders communicating individually with a base station.

27 Claims, 2 Drawing Sheets

METHOD AND CIRCUIT ARRANGEMENT FOR HOLDING A CONTROL STATE DURING INADEQUATE POWER SUPPLY IN AN RF TRANSPONDER OR REMOTE SENSOR

PRIORITY CLAIM

This application is based on and claims the priority under 35 U.S.C. §119 of German Patent Application 10 2004 007106.3, filed on Feb. 13, 2004, the entire disclosure of which is incorporated herein by reference.

FIELD OF THE INVENTION

The invention relates to circuit arrangements and methods, as well as RF transponders and remote sensors using such circuit arrangements and methods, for carrying out a controlled communication between one or more transponders or remote sensors and a base station via a field of electromagnetic waves.

BACKGROUND INFORMATION

In the present day, remote transponders are used in a broad variety of fields and applications of technology, preferably for example in the context of non-contact or contact-free identification systems, especially using a wireless data transmission via electromagnetic waves in the radio frequency (RF) range between the transponder and a base station. Such radio frequency identification (RFID) is suitable and applicable in all situations in which an automatic identification, characterization, recognition, interrogation, storage or stocking, monitoring, control, or transport of various objects is to be achieved. For example, using such RFID transponders, it is possible to individually mark and identify storage and transport containers, machines, vehicles, products, parts of products, persons, etc.

For individually identifying the object to which the RFID transponder, or so-called "tag" or "label", is attached, the transponder comprises or is associated with a data carrier that stores, contains or embodies the identifying information that is to be interrogated. Thus, the RFID transponder, through its wireless communication with a base station, or so-called "reader" or "interrogator", makes it possible to identify the object that has been tagged or labeled with the transponder, without contact, without a visual sight connection, and independently from the base station "reader". In this regard, the transponder may be located directly on the pertinent object, or in or on an associated transport device such as a container, a pallet, packaging, or the like.

Since even adverse environmental influences or weather conditions do not create any obstacle or problem for the transmission of electromagnetic waves, the wireless communication of data between the transponder and the base station can be carried out reliably, securely, and error-free over relatively large spacing distances of up to 2 m or more.

Another important application of such RFID systems is in the field of motor vehicle technology, and particularly in anti-theft systems and blocking systems to prevent the driving-away of the vehicle, in which the transponder is installed in the motor vehicle ignition key, for example.

As mentioned above, an RFID system generally includes two main components, namely the transponder (tag or label) and the base station (reader or interrogator). The transponder is typically a passive device that does not include its own power supply, but instead extracts its required operating power from the electromagnetic field emitted by the base station and received by the transponder. The transponder is portable and remote, and is arranged on the object to be identified. On the other hand, the base station or reader may be stationary or portable and mobile. The transponder, as the core component of such a system, comprises an integrated circuit (IC) as a data carrier as well as a transmitting and receiving arrangement including a radio antenna. The base station or reader comprises a control unit, a frequency module, and at least one transmitting and receiving arrangement including a radio antenna.

The transponder further provides the possibility of storing data, which may be changed, updated, or replaced as needed simply by reprogramming the IC of the transponder, for example in comparison to the fixed information permanently stored in bar code labels or the like.

The data exchange or communication between the transponder and the base station is carried out via an electromagnetic field in any one or more frequencies in various frequency ranges, preferably in the RF range as mentioned above, and especially in the ultrahigh frequency (UHF) or microwave (MW) ranges.

In many applications, a passive RFID system will include a plurality of transponders that are located in a single common RF field, for example emitted by a single base station or reader, whereby all of these transponders are to be read-out by the single base station. In this context, it is typical to employ so-called anti-collision procedures so as to serially interrogate and read-out the several transponders one at a time, while avoiding collisions, interference and crosstalk caused by several transponders communicating at once. After reading-out a particular data set, for example an identification number (ID) out of the integrated circuit of a particular transponder, this transponder is then switched to an inactive mode, so that it becomes silent or mute and no longer participates in a communication with the base station or reader. Thus, thereafter further transponders can be read-out in succession with as little interference as possible. Such general anti-collision procedures are described, for example, in the Publication "RFID Handbuch" ("RFID Handbook") by Finkenzeller, published by Hanser Publishers of Munich Germany.

In order to ensure the proper intended behavior of each transponder according to the anti-collision procedure or protocol, each transponder must maintain or hold its appropriate control condition or status throughout the entire procedure. Most importantly, this requires at least that a particular transponder, after the successful reading-out of its data set, no longer participates in and does not re-join in the communication with the base station. This aspect also becomes problematic or difficult because the passive transponders must obtain all their operating energy requirements by extracting the energy from the RF field emitted by the base station. In certain situations, so-called field gaps arise in the RF field, which result in an inadequate energy supply for any transponder located in such a field gap.

This aspect becomes especially critical when the carrier frequencies for the communication between the transponder and the base station are in the UHF or MW ranges, and especially if the positions of the transponders in space vary or move relative to the base station. Namely, especially in the UHF and MW ranges, such spatial areas or field gaps in which the energy supply for the transponder from the carrier signal is no longer adequate arise due to the superimposing of reflections of the field, and the like.

Thus, when a particular transponder is located in such a spatial area or field gap, it is necessary that the transponder supplies its ongoing operating energy requirement from an on-board energy storage device located on the transponder, typically comprising a capacitor. Thus, energy stored in the capacitor is used to "bridge over" the energy requirements of the transponder for temporary periods when it is located in such a field gap with an inadequate energy supply from the emitted RF field. Since the time periods for bridging over such field gaps can become rather long, and are typically in the range of several seconds, the on-board storage capacitor (or capacitors) must have a relatively large storage capacity, e.g. on the order of microfarads. Thus, the energy storage arrangement consumes a relatively large surface area on the integrated circuit of the transponder, so that such attempted solutions of the field gap problem have been structurally, practically, and economically unacceptable. For this reason, there have been prior efforts to ensure that such field gaps resulting in a temporary inadequate power supply for the transponder do not have negative influences on the anti-collision procedures.

U.S. Pat. No. 5,963,144 (Kruest) discloses a transponder, a circuit arrangement and a method for controlling such a transponder and circuit arrangement in the general field as discussed above. Particularly, after the transponder is recognized and registered by the base station, the transponder is completely switched off for a time duration t, whereby t amounts to approximately two seconds. After expiration of this time t, the pertinent transponder will automatically rejoin and latch into the ongoing communication with the base station, independently of whether or not the anti-collision procedure has already been completed. According to the cited US patent, the respective transponder is switched off and removed from the communication by adjusting the input impedance of the transponder. This is disadvantageous, however, because the pertinent transponder can thus not be interrogated or communicated with for other reasons, i.e. for any reason or in any manner, during the time period in which it is switched to the inactive mode. Moreover, it becomes problematic that undefined control conditions or states of the transponder can arise as a result of power supply gaps, because there is no way for the transponder to hold or "remember" the particular proper existing control condition throughout such a power supply gap. Thus, after expiration of the off-line or inactive time t, such undefined control conditions could possibly be transmitted to the entire system.

While the basic state of the art underlying the present invention, as generally discussed above, has related to remote or autonomous passive transponders, the same considerations also apply to so-called remote sensors. A remote sensor can be considered as a special type of remote transponder devices that further includes a sensor for sensing the local existing data that are to be transmitted back to the base station. Namely, while the transponders discussed above communicate data that has been stored on-board the transponder (i.e. a stored data or identification transponder), a remote sensor is a transponder further including a sensor, for example for sensing temperature, pressure, motion, gas composition, particles, light intensity, or the like, so that the remote sensor can then wirelessly communicate the sensed data back to the base station. Just like any remote transponder, the remote sensor receives its operating energy as well as control instructions (e.g. sensing or measuring instructions) from the base station.

Throughout this specification, the terms "transponder" or "remote transponder" should be understood to cover both an identification transponder or stored data transponder as well as a remote sensor transponder, unless the specific context indicates that one or the other type of transponder is specifically being addressed.

SUMMARY OF THE INVENTION

In view of the above, it is an object of the invention to provide a remote transponder (i.e. an identification or stored data transponder, or a remote sensor), a circuit arrangement for a transponder, an arrangement of plural transponders and a base station, as well as a method for the control of such transponders, further developed and improved so that a control of the transponder by a base station is possible at all times, and so that an anti-collision procedure for a communication between the transponder and the base station can be carried out surely, reliably and error-free. Particularly, it is an object of the invention to avoid the occurrence of undefined control conditions or states, during energy supply gaps or periods of inadequate energy supply from the electromagnetic field received by the transponder. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a device comprising a circuit arrangement for an RF transponder. The circuit arrangement comprises:
- at least one power input adapted to have electrical operating power applied thereto;
- at least one control input adapted to have at least one electrical control signal applied thereto;
- a first storage arrangement that is connected to the at least one control input to receive the at least one control signal, and that is adapted to produce and store a control state of the circuit arrangement in response to and dependent on the control signal when the operating power applied to the power input is at or above an adequate level;
- a second storage arrangement that is connected to a first output of the first storage arrangement to receive the control state, and that is adapted to hold the control state at least temporarily when the operating power applied to the power input is below the adequate level; and
- a signal output connected to an output of the second storage arrangement.

The invention also provides a transponder device including such a circuit arrangement according to the invention, whereby the transponder device may involve a stored-data or identification transponder or a remote sensor. Still further, the invention also provides an arrangement or system of a plurality of such transponder devices cooperating with a base station.

The above objects have further been achieved according to the invention in a method of operating at least one transponder device, comprising the steps:
a) receiving, with the transponder device, a transmitted control signal;
b) at least intermittently providing electrical power to the transponder device;
c) in response to and dependent on the control signal, producing and storing a control state in a first storage arrangement of the transponder device when the electrical power is at or above an adequate level; and
d) holding the control state in a second storage arrangement of the transponder device during a holding time t when the electrical power is below the adequate level.

Such a method also applies to the control of one or more transponder devices according to the invention, incorporating a circuit arrangement according to the invention.

A basic underlying aspect and one key feature of the invention is that the existing control condition, state or status of the circuit arrangement or a transponder device incorporating such a circuit arrangement is held by a second memory or storage device in the event of, and during the time of, an energy supply gap, i.e. a time of inadequate energy being supplied to the circuit arrangement from the received electromagnetic field. In this manner, the invention at least temporarily (during the critical times) maintains the pertinent data and particularly the pertinent control status of the transponder circuit arrangement, and thereby ensures that undefined control conditions will not arise. This is especially important in the context of carrying out an anti-collision procedure in connection with plural transponder devices arranged in a common electromagnetic wave field and respectively communicating with a common base station, for example.

In the context of a further specific embodiment, the inventive circuit arrangement provides a switchable logic storage device as the first storage device. Preferably, this first storage device comprises a D-flip-flop (delay flip-flop or delay element). In this manner, a well-defined control signal can be provided simply, surely and reliably, for example a control signal for switching an inventive transponder circuit arrangement between an active condition and a mute or silenced condition.

According to a further embodiment of the invention, the second storage device is especially embodied as an energy store or storage device for storing electrical energy, for example preferably a storage device comprising a capacitor. This storage device ensures in a simple manner, that a particular stored control condition, e.g. a control signal level of the first storage device, will be held or maintained even in the case of an energy supply gap. Thus, the inventive circuit arrangement will ensure an on-going well-defined communication behavior of the respective transponder even in the case of intervening energy supply gaps.

Especially when the second storage device is embodied as or comprises a capacitor, this second storage device serves to hold a control condition of the first storage device during a time t, whereby $0 < t \leq t_{max}$, with the time t being determined by a characteristic discharge time of the capacitor. Preferably, the maximum time $t_{max}$ amounts to approximately nine seconds. In an especially preferred embodiment of the circuit arrangement according to the invention, the state or status holding time t amounts to approximately two seconds. In this context, the term "approximately" allows for tolerances and variations arising in devices during production, as well as temperature influences and aging influences on the devices. For example, the term "approximately" allows for a variation of ±5% or ±10%. In this manner, the invention assures that even relatively long energy supply gaps can be bridged over. The above mentioned time periods are dependent on the leakage current L and are thus strongly dependent on the temperature T ($L \sim e^{-T}$).

While in principle, the inventive circuit arrangement can be embodied as an actively powered circuit arrangement, i.e. a circuit arrangement that is actively supplied with its operating energy, an especially preferred embodiment of the invention involves a passive circuit arrangement in which the receiving arrangement is also adapted to receive incident electromagnetic energy from the electromagnetic field for supplying the electrical energy required by the circuit arrangement. Such an embodiment provides for the simplest possible design of the circuit arrangement, which particularly embodies a purely passive assembly.

In an application of the inventive circuit arrangement in a transponder device, and especially an RF transponder, the latter is preferably controllable by a logic output signal of the circuit arrangement. This applies both to a stored data or identification transponder device as well as a remote sensor transponder device.

In a most preferred further embodiment of the inventive method, a transponder device is selectively switched by a control signal either to an active state or to a muted or silenced state with respect to a communication from the transponder device to the base station. Particularly, the transponder device is preferably switched to the muted or silenced state after the communication of its data to the base station has been completed. This especially increases the assurance and reliability of an anti-collision procedure being carried out in a system including several transponder devices communicating with a base station, to prevent already-interrogated transponders from interfering in the communication of the base station with successive transponders that are still to be interrogated.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
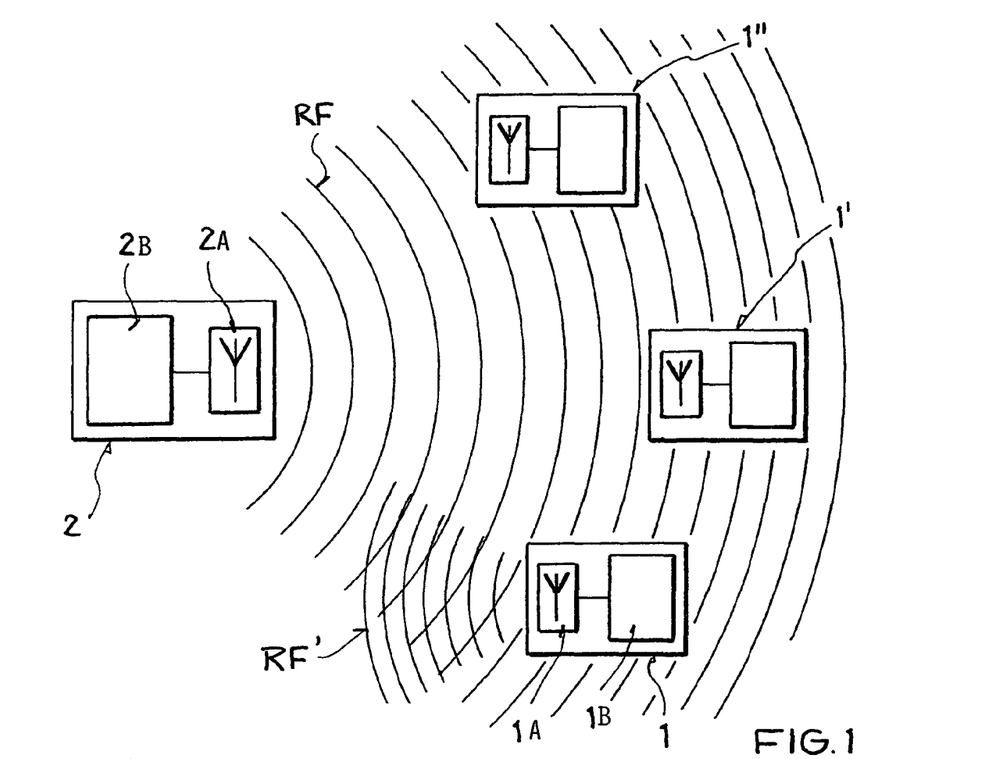
FIG. 1 is a schematic illustration of an inventive system including plural transponder devices arranged in a common electromagnetic wave field of a base station.

As shown schematically in FIG. 1, a transponder system according to the invention includes a plurality of transponder devices 1, 1' and 1" arranged in common within an RF electromagnetic wave field RF emitted by a base station 2. As generally indicated in FIG. 1, each one of the transponder devices 1, 1' and 1" respectively comprises a transmitting and receiving arrangement 1A comprising a dipole antenna, as well as further circuits 1B connected to the transmitting and receiving arrangement 1A. These further circuits 1B are especially in the form of integrated circuits (ICs) of which the sub-circuits or components that are important according to the invention are described below in further detail in connection with FIGS. 2 to 4. The base station 2, also called an RFID reader, comprises a transmitting and receiving arrangement 2A as well as further circuits 2B, for example modulators, demodulators, amplifiers, frequency generators, microcontrollers, etc., connected to the transmitting and receiving arrangement 2A.

The transponder devices 1, 1' and 1" according to the invention are preferably embodied as passive assemblies. That is to say, the transponder devices do not include their own on-board energy supply, but rather are each respectively supplied with their required electrical energy from electromagnetic energy provided by the base station 2 in the electromagnetic wave field RF. Namely, the required energy is extracted from the electromagnetic wave field RF by the transmitting and receiving arrangement 1A of the respective transponder device 1, 1' and 1".

The circuits 2B of the base station 2 are adapted to transmit and receive radio frequency signals RF and RF', and are adapted to digitally evaluate the received signals RF'. In this regard, the components, arrangement, and operation of the arrangement 2A and the circuits 2B of the base station 2 are conventionally known in many different variations, and need not be described in further detail here.

As shown in the manner of an example by the transponder device 1, each transponder device communicates back to the base station 2 with a reply signal or wave field RF', for example produced by the modulated backscattering of the received signal or wave field RF. For example, this reply signal or field RF' involves the interrogation of data stored in the circuits 1B of the respective transponder device 1, 1' or 1". This stored data may, for example, be an identification number or code ID. Alternatively, as discussed above, the present invention also applies to remote sensors as transponder devices, whereby the data are, for example, sensor data measured by the respective sensor. In any event, as discussed above, an anti-collision procedure is adhered to in the communication, to avoid a simultaneous or superimposed communication by several of the transponder devices 1, 1' and 1" with the base station 2 at any one time. Instead, to avoid interference, it must be ensured that only a respective one of the transponder devices 1, 1' or 1" communicates with the base station 2 at any one time. This can be achieved by switching the respective pertinent transponder into an active state or condition only during its "turn" to communicate, and switching this transponder to a mute or silenced state or condition when the communication of its data set has been completed.

Figure 2:
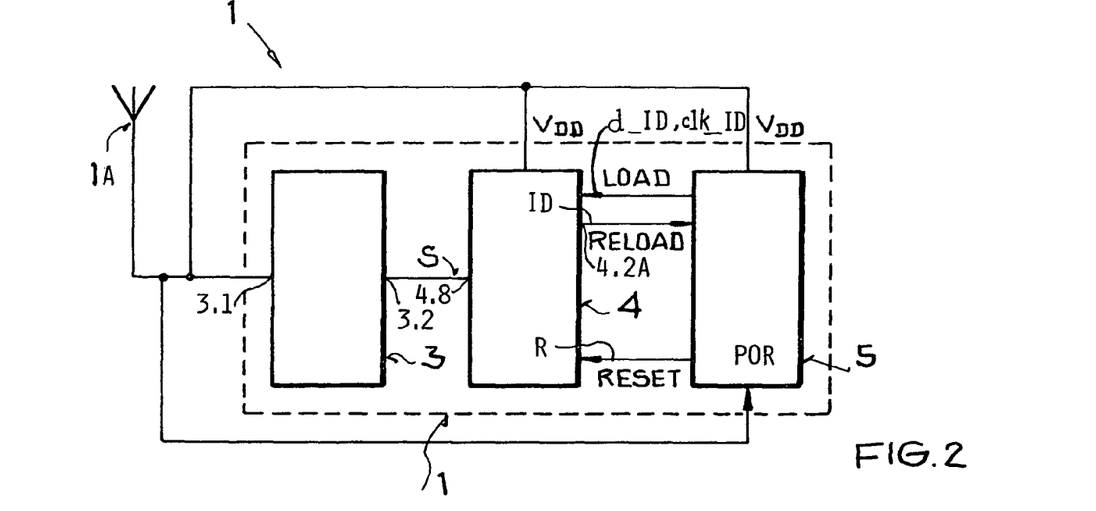
FIG. 2 is a schematic block circuit diagram of a single inventive transponder device.

FIG. 2 shows a schematic block circuit diagram of a transponder device 1 according to the invention. As generally discussed above, the transponder device 1 includes a transmitting and receiving arrangement 1A as well as circuits 1B connected thereto. More particularly, the circuits 1B include an input circuit 3, an inventive circuit arrangement 4 for holding a particular control condition or state, as well as a read/memory circuit 5 (which may comprise a sensor measurement circuit in the case of a remote sensor transponder).

In view of the embodiment of the transponder device 1 as a passive unit, the transmitting and receiving arrangement 1A serves not only for receiving data (e.g. control instructions) from the base station 2 and transmitting (e.g. backscattering) transponder data (RF' back to the base station 2, but also for extracting energy from the received field RF and supplying this energy as a supply voltage $V_{DD}$ to the further circuits 1B, especially the circuit arrangement 4 and the read/memory circuit 5. For this purpose, the inventive transponder device 1 typically also includes a suitable voltage converter or transformer arrangement (not shown in detail) such as a diode rectifier bridge, for producing a rectified DC voltage signal $V_{DD}$ from the alternating voltage energy received from the field RF by the transmitting and receiving arrangement 1A. The pertinent circuit arrangements, operations and functions in this regard are conventionally known to persons of ordinary skill in this art and need not be explained in further detail here.

The read/memory circuit 5 includes one or more suitable memory or storage arrangements (not shown in FIG. 2) for storing at least the data that are to be read-out from the ID or stored-data transponder device 1 (or at least one sensor arrangement acquiring the data that are to be read-out from a remote sensor type transponder device 1). The arrows LOAD, RELOAD, and RESET between the circuit arrangement 4 and the read/memory circuit 5 represent the transmission of corresponding signals between these circuit components of the transponder device 1, and will be described in detail below. The label POR represents a possible Power-On-Reset POR of the read/memory circuit 5.

In the following discussion in connection with FIGS. 3 and 4, the detailed embodiments of the input circuit 3, the circuit arrangement 4, and the read/memory circuit 5, as well as the respective interactions thereof with one another, will be described in further detail.

Figure 3:
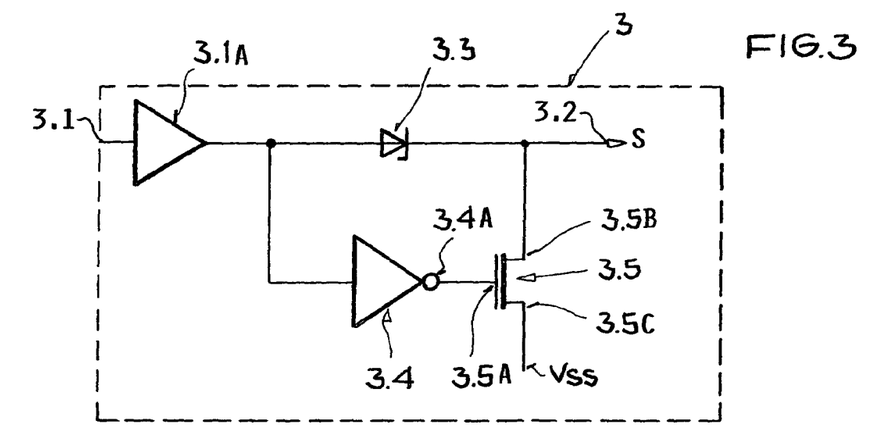
FIG. 3 is a schematic circuit diagram of a first assembly or circuit of an inventive transponder device.

FIG. 3 shows a detailed, yet schematic circuit diagram of an inventive input circuit 3 of the transponder device 1, 1' or 1". In the present example embodiment, the input circuit 3 is fully monolithically integrated as a single integrated circuit. The input circuit 3 comprises an input 3.1 for receiving a control signal, e.g. from the transmitting and receiving arrangement 1A, and an output 3.2 for outputting a further processed control or status signal S. An input element 3.1A such as an amplifier is connected to the input 3.1, and an electrical valve device in the form of a Schottky diode 3.3 is interposed and interconnected between the input element 3.1A and the output 3.2. The input circuit 3 further includes an inverter device 3.4 connected parallel to the Schottky diode 3.3, whereby the output 3.4A of the inverter device 3.4 is connected to the gate 3.5A of a field effect transistor 3.5. The drain terminal 3.5B of the transistor 3.5 is connected to, and lies at the potential of, the output 3.2 of the input circuit 3, while the source terminal 3.5C of the transistor 3.5 is connected to the substrate potential $V_{SS}$.

The control signal applied to the input 3.1 of the input circuit 3 may, for example, be a reset signal that exhibits a positive voltage relative to the substrate potential $V_{SS}$. Thus, when such a signal is applied to, or exits at, the input 3.1, a forward conducting current or on-state current will flow through the Schottky diode 3.3, whereby a defined status signal S exhibiting a high logic signal level will arise at the output 3.2 of the input circuit 3. Note that the Schottky diode 3.3, in comparison to normal diodes, exhibits essentially no charge storage in the forward conducting state, and therefore serves as an extremely rapidly acting switching diode without any measurable blocking delay. As will be described in detail below, the resulting control or status signal S will be used as a control signal input to the inventive circuit arrangement 4 as shown in FIG. 4.

On the other hand, if no input signal (e.g. no reset signal) is present at the input 3.1 of the input circuit 3, then the resulting low signal level applied to the inverter 3.4 will produce a high signal at the output 3.4A of the inverter 3.4, which in turn is applied to the gate 3.5A of the transistor 3.5 and thus switches the transistor 3.5 into a conducting condition. As a result, the output 3.2 of the input circuit 3 will be pulled in a defined manner through the conducting transistor 3.5 to the substrate potential $V_{SS}$ as a reference potential, e.g. establishing a low logic signal level.

Preferably, the input circuit 3 is monolithically integrated together with the circuit arrangement 4 and the read/memory circuit 5 to be described below, to form thereof a single monolithic integrated circuit.

Figure 4:
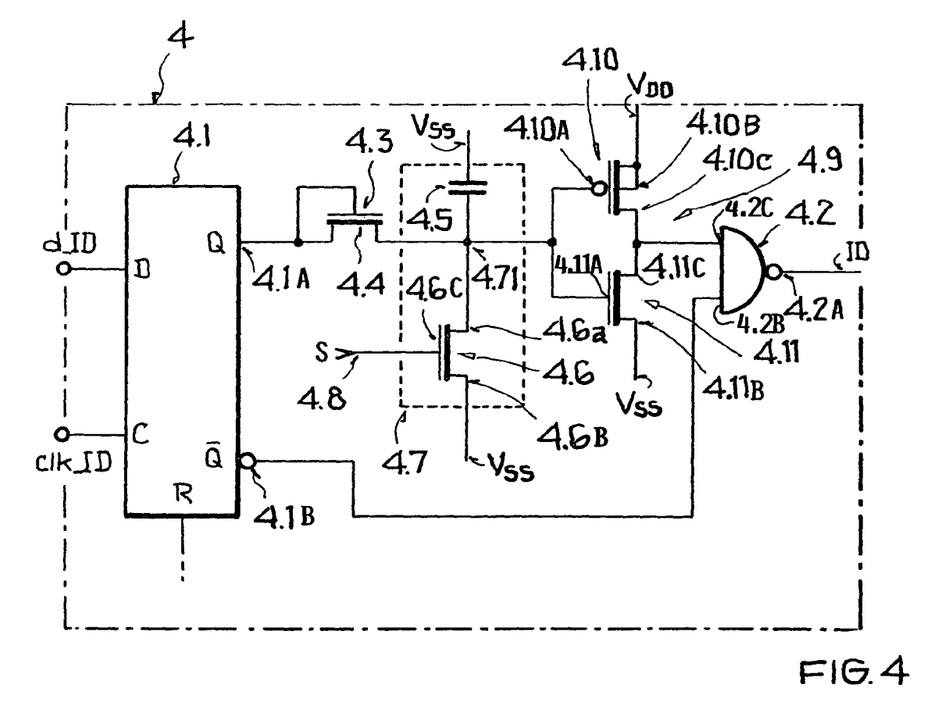
FIG. 4 is a schematic circuit diagram of an inventive circuit arrangement as a second circuit or assembly of an inventive transponder device.

FIG. 4 shows a detailed, yet schematic circuit diagram of an inventive embodiment of the control state holding circuit arrangement 4. This circuit arrangement 4 includes an input D for a data signal d_ID, as well as an input C for a clock signal clk_ID, whereby these respective signals are provided by the read/memory circuit 5 as schematically indicated by the arrow LOAD in FIG. 2. Thus, relative to the circuit arrangement 4, the read/memory circuit 5 functions as a "state machine" for defining the control state or status of the circuit arrangement 4, as will be described in further detail below.

More particularly, the above mentioned input D for the data signal d_ID and input C for the clock signal clk_ID are respectively the data input D and the clock input C of a first storage device in the form of a D-flip-flop 4.1. The D-flip-flop 4.1 further comprises two outputs 4.1A providing an output value or signal Q and 4.1B providing an output value or signal $\overline{Q}$. In other words, the output 4.1B provides the opposite or inverted output signal relative to the output 4.1A. Further in the present example embodiment of FIG. 4, the D-flip-flop 4.1 also has a reset input R.

The output 4.1B of the D-flip-flop 4.1 is connected directly to a first input 4.2B of a NAND gate 4.2. On the other hand, the output 4.1A of the D-flip-flop 4.1 is connected to a current source 4.3 in the form of a field effect transistor 4.4 with short-circuited gate and source terminals. The circuit arrangement 4 further comprises a second memory or storage device or arrangement 4.7 including a capacitor 4.5 connected to the drain terminal of the transistor 4.4, as well as a further field effect transistor 4.6 connected parallel to the capacitor 4.5 between the drain terminal of the transistor 4.4 and the substrate voltage $V_{SS}$. In other words, more particularly, one terminal of the capacitor 4.5 is connected to the drain terminal 4.6A of the transistor 4.6 at a circuit node 4.71 that is also connected to the drain terminal of the transistor 4.4. On the other hand, the opposite or other terminal of the capacitor 4.5 as well as the source terminal 4.6B of the transistor 4.6 are respectively connected to the substrate potential $V_{SS}$. The gate terminal 4.6C of the transistor 4.6 is connected with an input 4.8 of the circuit arrangement 4 connected to the output 3.2 of the input circuit 3 (see FIGS. 2 and 3). Thus, the control or status signal S produced at the output 3.2 of the input circuit 3 will be provided through the input 4.8 of the circuit arrangement 4 to the gate 4.6C of the transistor 4.6.

Connected downstream from the second storage device 4.7, the inventive circuit arrangement 4 further comprises a switching stage 4.9 that includes two MOSFET transistors, particularly a PMOS transistor 4.10 and an NMOS transistor 4.11, connected, in a manner, parallel to each other as shown in FIG. 4. The respective gates 4.10A and 4.11A of the two transistors 4.10 and 4.11 are connected together to the second storage device 4.7 at the circuit node 4.71. The combined source and body or bulk terminals 4.10B of the PMOS transistor 4.10 are connected to the supply voltage $V_{DD}$, e.g. a diode drop voltage provided by the above mentioned diode rectifier bridge. On the other hand, the source terminal 4.11B of the NMOS transistor 4.11 is connected to the substrate potential $V_{SS}$. Furthermore, the two transistors 4.10 and 4.11 are connected with their drain terminals 4.10C and 4.11C to each other and to a second input 4.2C of the NAND gate 4.2. This NAND gate 4.2 further comprises an output 4.2A which forms the output of the circuit arrangement 4, at which a signal ID is produced. As shown in FIG. 2, the read/memory circuit 5 of the transponder device 1 is connected to this output 4.2A providing the ID signal, as indicated by the RELOAD arrow in FIG. 2.

In the context of the present invention, the inventive circuit arrangement 4 shown and described in connection with FIG. 4 can be understood as embodying a status register. In this regard, the circuit arrangement 4 supports or assists the proper execution of an anti-collision procedure, as follows. In this regard, after the detection of a given transponder device (or so-called "tag") 1 by the base station 2, the first storage device embodied as D-flip-flop 4.1 of the transponder device 1 is "set", i.e. is set to the logic value one (1) by means of a suitable control signal received by the transmitting and receiving arrangement 1A of the transponder device 1, in accordance with the LOAD signals d_ID and clk_ID provided by the read/memory circuit 5. For this to occur, a logic high level signal must simultaneously be present at both inputs D and C of the D-flip-flop 4.1. Namely, the two signals d_ID and clk_ID must simultaneously be high.

In that "set" condition, the outputs 4.1A and 4.1B of the D-flip-flop 4.1 will provide the value Q=1 and $\overline{Q}$=0. As described above, the latter signal value $\overline{Q}$=0 will be provided directly to the first input 4.2B of the NAND gate 4.2, as long as the transponder device 1 is provided with operating voltage.

According to the invention, when the respective transponder device 1, 1' or 1" has finished return-transmitting its data set, and its status register circuit arrangement 4 has been "set" as described above, then the transponder device is not fully or completely switched off, but rather merely switched into a mute or silenced inactive condition. That mans that the respective transponder device 1 will no longer participate in the communication with the base station 2, until it receives a corresponding new control command or instruction to switch back to the active condition. Particularly, such a command or instruction will cause the status register circuit arrangement 4 and particularly the D-flip-flop 4.1 thereof to be set back to the value Q=0, in the following manner.

When at first the signal Q=1 (high signal level) and $\overline{Q}$=0 (low signal level) pertains, the low signal $\overline{Q}$=0 is directly applied to the first input 4.2B of the NAND gate 4.2, and the further processing of the signal Q to determine the signal level applied to the other input 4.2C of the NAND gate 4.2 is determined by whether or not a reset or status signal S is present at the input 4.8. If no reset or status signal S is present at the input 4.8, i.e. a low signal level prevails there, then the transistor 4.6 will be blocked, i.e. non-conducting, and consequently the capacitor 4.5 will be charged up. Since the switching stage 4.9 functions as a CMOS inverter, the switching stage 4.9 will produce a low signal level applied to the second input 4.2C of the NAND gate 4.2. As a result, with a low signal applied to each input, the NAND gate 4.2 will produce the logic high value one (1) at the output 4.2A as the logic output signal ID. This high signal ID is provided via the RELOAD path to the read/memory circuit 5 (see FIG. 2) and serves to switch the transponder device 1 into the mute or silenced inactive state according to the invention.

In the opposite situation in which Q=0 and $\overline{Q}$=1, the signal level state of the circuit node 4.71 becomes decisive. If the capacitor 4.5 is charged, then the circuit node 4.71 is at a high signal level. When the voltage at the output Q of the flip-flop 4.1 sinks or drops off, e.g. when going to zero, the transistor 4.3 prevents the capacitor 4.5 or the circuit node 4.71 from discharging via the node or output 4.1A of the flip-flop 4.1 providing the signal Q. Furthermore, the switching stage 4.9 comprising the inverter made up of the transistors 4.10 and 4.11 produces a low signal level at the second input 4.2C of the NAND gate 4.2. Thus, the NAND gate 4.2 again produces a high signal level as the signal ID at the output 4.2A.

On the other hand, if the capacitor 4.5 is discharged, i.e. the voltage at the circuit note 4.71 has dropped to a low signal level, then the switching stage 4.9 operating as an inverter produces a high signal level at the second input 4.2C of the NAND gate 4.2. Meanwhile, the signal $\overline{Q}$=1 is also applying a high signal level directly to the first input 4.2B of the NAND gate 4.2, so that the output 4.2A of the NAND gate 4.2 will produce the signal ID having a low signal level as a result.

Furthermore, a direct influence can be exerted on the charge state or condition of the capacitor 4.5 by means of the status signal S applied via the input 4.8 to the gate 4.6C of the transistor 4.6. Namely, by appropriately controlling the transistor 4.6 via the status signal S, the capacitor 4.5 can be discharged through the transistor 4.6 to bring the circuit node 4.71 down to a low signal level.

Now consider what happens when the incident external electromagnetic field RF is missing or of inadequate field strength, e.g. in a particular spatial area representing a field gap. In such a situation, the receiving and transmitting arrangement 1A of the transponder device 1 is not able to extract and produce sufficient energy for the operating needs of the transponder device. Thus, the supply voltage $V_{DD}$ drops off. As a result, after a time, nearly all of the circuit elements and circuit nodes of the circuit components drop to a low voltage or non-energized state. Moreover, no voltage is applied to the read/memory circuit 5. Thus, all of the control signals, and especially d_ID, clk_ID, or an input signal as well as signals R or S drop to a low signal level. Also within the circuit arrangement 4, the signals Q, $\overline{Q}$, S, ID, and R drop to the low signal level. Only the circuit node 4.71 of the capacitor 4.5 remains (at least temporarily) at the high signal level, as long as, or insofar as, the capacitor 4.5 is charged. In this regard, the transistor 4.3 prevents the circuit node 4.71 from discharging through the terminal 4.1A of the D-flip-flop 4.1. Thus, the charge state of the capacitor 4.5 and thus of the circuit node 4.71 is held or maintained (at least for a temporary time t) even if the supply voltage $V_{DD}$ drops to an inadequate level or even 0.

Thereafter, if the transmitted electromagnetic field RF is again present and received with a sufficient field strength (e.g. the receiving arrangement 1A has moved out of the field gap), then the normal supply voltage $V_{DD}$ will again be produced, and the inverter or switching stage 4.9 will determine, dependent on the voltage level existing at the circuit node 4.71, to what extent the signal ID produced at the output 4.2A should be set to the high signal level, as discussed above. If the signal ID is high, then the read/memory circuit 5 generates the necessary signals to bring about the LOAD or RELOAD process. Thereby, the D-flip-flop 4.1 is set directly by means of the signals d_ID, clk_ID, and R, so that the signal Q goes high, i.e. Q=1, and the capacitor 4.5 is once again charged up to the supply voltage $V_{DD}$.

In the above context, the respective transponder device 1, 1' or 1", according to the invention, can still be interrogated by the base station 2, and if applicable switched back to an active state, at any time during the anti-collision procedure, and especially even after the respective transponder device has been switched to a muted or silenced inactive state. In other words, even in the muted or silenced inactive state, the transponder still remains able to receive command communications from the base station.

After the end of a temporary energy supply gap, e.g. after leaving the spatial area of a field gap, whereby the period of being in the field gap had a time duration below the characteristic discharge time t of the capacitor 4.5, the respective transponder device will not automatically re-engage or participate in a communication with the base station 2. To the contrary, according to the invention, the transponder device has held or maintained its previous control condition or state via the circuit arrangement 4 acting as a status register. Thus, once the energy gap or field gap has ended, and the normal energy supply is resumed, the transponder device will remain in or resume whichever particular control condition or state existed before the beginning of the energy gap or field gap. In this manner, the anti-collision procedure becomes significantly more sure and reliable.

In order to ensure that the transponder device 1 will be able to hold or maintain the respective existing control condition even when a field gap arises in the RF field (see FIG. 1), the invention especially provides the second storage device 4.7 including the transistor 4.6 and the capacitor 4.5. In its function as an electrical energy storage device, the capacitor 4.5 is charged for the state Q=1 (if no status or reset signal S is present at the input 4.8), and is not charged for the state Q=0. Depending on its particular concrete construction and embodiment, the capacitor 4.5 is discharged in a characteristic discharge time t whenever an energy supply gap arises. This characteristic discharge time t is temperature dependent and can amount to up to 9 seconds at a temperature of 25° C. For typical applications, this characteristic discharge time is 2 seconds. Thus, during this time t, the capacitor 4.5 is able to hold or maintain the respective existing control stage $Q \in 0, 1$ of the first storage device 4.1. If a reset or status signal S is applied to the input 4.8 (see FIG. 3), then the transistor 4.6 in the second storage device 4.7 is switched to a conductive condition, so that the capacitor 4.5 is rapidly discharged, independently of the respective existing control state of the status register, so that the second storage device 4.7 is ready to take-on and hold the next new control state that is currently existing upon the new setting of the register. A corresponding reset signal is applied to the input R of the D-flip-flop 4.1 by the read/memory circuit 5 according to the arrow RESET as shown in FIG. 2.

The discharge time t, or correspondingly the status holding time t of the inventive circuit arrangement 4 is dependent on the switching threshold of the CMOS inverter 4.9, which serves as an evaluating circuit for the signal level of the voltage of the second storage device 4.7 represented at the circuit node 4.71. This switching threshold of the inverter 4.9 can be influenced by suitable adaptation of the width/length ratio W/L of the MOSFET transistors 4.10 and 4.11. Particularly, for example, an increased ratio w/L of the NMOS transistor 4.11, if applicable simultaneously with a reduced ratio W/L of the PMOS transistor 4.10, achieves a reduction of the switching threshold. In the reversed case, i.e. reversed W/L ratios compared to the above discussion, the switching threshold will be increased. As a result, the reduced switching threshold will provide a longer state holding time t, while a higher switching threshold will lead to a shorter state holding time t.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A device comprising a circuit arrangement for an RF transponder, said circuit arrangement comprising:
    at least one power input adapted to have electrical operating power applied thereto;
    at least one control input adapted to have at least one electrical control signal applied thereto;
    a first storage arrangement that is connected to said at least one control input to receive said at least one control signal, and that is adapted to produce and store a control state of said circuit arrangement in response to and dependent on said control signal when said operating power applied to said power input is at or above an adequate level;
    a second storage arrangement that is connected to a first output of said first storage arrangement to receive said control state, and that is adapted to hold said control state at least temporarily when said operating power applied to said power input is below said adequate level; and a signal output arrangement configured to receive an output of said second storage arrangement and a second output of said first storage arrangement, and to provide an output signal, wherein the second output of said first storage arrangement is inverted with respect to the at least one control signal.

2. The device according to claim 1, wherein said first storage arrangement comprises a switchable logic storage device that is switchable between two logic values of said control state in response to and dependent on said control signal.

3. The device according to claim 1, wherein said first storage arrangement comprises a D-flip-flop.

4. The device according to claim 1, wherein said second storage arrangement is adapted to hold said control state temporarily for a holding time t, with 0<t<tmax, following a time when said operating power falls below said adequate level.

5. The device according to claim 4, wherein said tmax is equal to 9 seconds.

6. The device according to claim 4, wherein said holding time t is equal to 2 seconds.

7. The device according to claim 4, wherein said holding time t is equal to 9 seconds.

8. The device according to claim 1, wherein said second storage arrangement is adapted to store electrical energy.

9. The device according to claim 1, wherein said second storage arrangement comprises a capacitor connected to said first output of said first storage arrangement.

10. The device according to claim 9, wherein said capacitor is connected between said first output of said first storage arrangement and a reference voltage terminal, and wherein said circuit arrangement further comprises a first transistor having a controlled conduction path connected parallel to said capacitor.

11. The device according to claim 10, wherein said device further comprises an input circuit including an input element adapted to receive an input signal, a Schottky diode and an inverter connected in parallel to an output of said input element, a second transistor having a control electrode connected to an output of said inverter and a controlled conduction path connected between an output of said Schottky diode and a reference voltage terminal, and an output terminal connected to said output of said Schottky diode; and wherein said output terminal of said input circuit is connected to a control electrode of said first transistor of said circuit arrangement.

12. The device according to claim 10, wherein:

said circuit arrangement further comprises an inverting switching stage and a NAND gate interposed between said signal output of said circuit arrangement and said output of said second storage arrangement;

said NAND gate has a first input connected to a second output of said first storage arrangement that is inverted relative to said first output of said first storage device;

said inverting switching stage is connected between a second input of said NAND gate and a common circuit node connected to said capacitor, said first transistor and said first output of said first storage arrangement;

said common circuit node forms said output of said second storage arrangement; and said NAND gate further has an output connected to said signal output of said circuit arrangement.

13. The device according to claim 1, further comprising a receiver arrangement that is adapted to receive an RF electromagnetic wave carrying a control command, and adapted to extract said electrical operating power from said electromagnetic wave.

14. The device according to claim 13, wherein said device is an RF transponder.

15. The device according to claim 14, wherein said RF transponder further comprises a read/memory circuit connected to said at least one control input and said signal output of said circuit arrangement, and wherein said RF transponder is adapted to be controlled by a logic signal provided at said signal output of said circuit arrangement through said read/memory circuit.

16. A system comprising a plurality of RF transponders each of said RF transponders comprising a circuit arrangement, said circuit arrangement comprising:

at least one power input adapted to have electrical operating power applied thereto;

at least one control input adapted to have at least one electrical control signal applied thereto;

a first storage arrangement that is connected to said at least one control input to receive said at least one control signal, and that is adapted to produce and store a control state of said circuit arrangement in response to and dependent an said control signal when said operating power applied to said power input is at or above an adequate level;

a second storage arrangement that is connected to a first output of said first storage arrangement to receive said control state, and that is adapted to hold said control state at least temporarily when said operating power applied to said power input is below said adequate level; and a signal output arrangement configured to receive an output of said second storage arrangement and a second output of said first storage arrangement, and to provide an output signal, wherein the second output of said first storage arrangement is inverted with respect to the at least one control signal; and a base station adapted to emit said RF electromagnetic wave.

17. The device according to claim 13, wherein said device is an RF remote sensor.

18. The device according to claim 17, wherein said RF remote sensor further comprises a read/sensor circuit connected to said at least one control input and said signal output of said circuit arrangement, and wherein said RF remote sensor is adapted to be controlled by a logic signal provided at said signal output of said circuit arrangement through said read/sensor circuit.

19. A system comprising a plurality of RF remote sensors, each of said RF remote sensors comprising a circuit arrangement, said circuit arrangement comprising:

at least one power input adapted to have electrical operating power applied thereto;

at least one control input adapted to have at least one electrical control signal applied thereto;

a first storage arrangement that is connected to said at least one control input to receive said at least one control signal, and that is adapted to produce and store a control state of said circuit arrangement in response to and dependent on said control signal when said operating power applied to said power input is at or above an adequate level;

a second storage arrangement that is connected to a first output of said first storage arrangement to receive said control state, and that is adapted to hold said control state at least temporarily when said operating power applied to said power input is below said adequate level; and a signal output arrangement configured to receive an output of said second storage arrangement and a second output of said first storage arrangement, and to provide an output signal, wherein the second output of said first storage arrangement is inverted with respect to the at least one control signal; and a base station adapted to emit said RF electromagnetic wave.

20. The device according to claim 1, wherein said device consists of said circuit arrangement.

21. An RF transponder device comprising a circuit arrangement that includes;

a flip-flop including at least one control input and a first control state output and a second control state output that is inverted with respect to the first control state output;

an energy storage arrangement including a capacitor configured to receive at least indirectly a signal from said first control state output;

a transistor switching stage connected to said energy storage arrangement; and a logic gate interposed between said transistor switching stage and a signal output of said circuit arrangement, wherein the logic gate configured to receive a first signal corresponding to the first control state output and a second signal corresponding to the second control state output.

22. The RF transponder device according to claim 21, wherein said logic gate is a NAND gate, said flip-flop has a second control state output inverted relative to said first control state output, and said NAND gate has a first gate input connected to said second control state output and a second gate input connected to said transistor switching stage.

23. The RF Transponder device according to claim 21, wherein said transistor switching stage includes a first transistor and a second transistor connected with respective controlled conduction paths thereof in series between a supply voltage terminal and a reference voltage terminal, said first and second transistors have respective gates thereof connected to said energy storage arrangement, and a node between said controlled conduction paths of said first and second transistors is connected to said logic gate.

24. The device according to claim 21, wherein said energy storage arrangement further comprises a transistor having a controlled conduction path connected parallel to said capacitor between said control state output and a reference voltage terminal.

25. The device according to claim 1, wherein said signal output is configured to provide an output signal to one or more entities outside said circuit arrangement based on said control state.

26. The device according to claim 1, wherein the output of said first storage arrangement is directly connected to the signal output arrangement.

27. The device according to claim 1, wherein the second storage arrangement includes a capacitor adapted to hold said control state and a transistor configured to discharge the capacitor on the basis of a status signal.

* * * * *